D. DULL.
NUT-LOCK.

No. 184,353.  Patented Nov. 14, 1876.

Witnesses,
George F. Robinson
J. H. Russel

Inventor
Daniel Dull
by Bradford Howland
his Attorney.

UNITED STATES PATENT OFFICE.

DANIEL DULL, OF SPRING TOWNSHIP, CRAWFORD COUNTY, PA.

IMPROVEMENT IN NUT-LOCKS.

Specification forming part of Letters Patent No. 184,353, dated November 14, 1876; application filed September 11, 1876.

*To all whom it may concern:*

Be it known that I, DANIEL DULL, of Spring township, Crawford county, Pennsylvania, have invented a new and useful Improvement in Nut-Locks for Locking the Nuts on Fish-Plates on Railroad-Rails, of which the following is a specification:

The object of my invention is to secure the nuts on the bolts which attach fish-plates to railroad-rails, so that the jar of the rails, caused by the passage of cars on them, will not loosen the nuts, and so that when desired the nuts can be easily and quickly removed. This I accomplish by placing a beveled spring between the nuts in such a manner that by its contact with a side of each nut the nuts and spring mutually bind each other, and the spring is retained in position against the fish-plate by its bevel and a corresponding bevel of the sides of the nuts.

Figure 1:
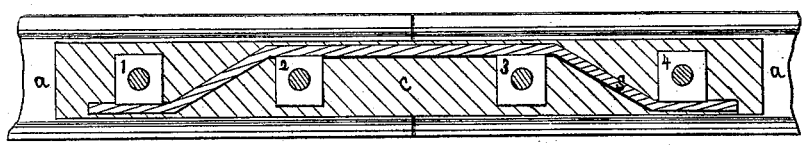
Figure 2:
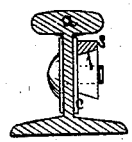

Figure 1 represents my device in place on the rail. Fig. 2 is a cross-section at nut 1, showing the bevels.

When the nuts 1 2 3 4 have been screwed on their bolts, and the fish-plate $c$ thereby firmly pressed against the rails $a\ a$, the spring $s$ is placed over the nuts 2 3, and under the nuts 1 4 by pressing down the ends of the spring. The sides of the nuts are beveled, so that one end of the nut is smaller than the other, and the smaller end is placed next to the fish-plate. The spring $s$ is beveled to correspond with the bevel of the nuts, where the spring and nuts come in contact with each other, which prevents the spring from being moved off from the nuts by the jar of the rails.

When the spring $s$ is in position, as shown in Fig. 1, the nuts cannot be turned until the spring is removed, which is done by bending the ends of the spring down as far as the depth of the bevel, when it can easily be removed.

I claim as my invention—

The spring $s$ when beveled on its side, and so shaped that in combination with three or more beveled nuts, by contact with a side of each nut, the beveled spring and beveled nuts are mutually bound in position, substantially as set forth.

DANIEL DULL.

Witnesses:
BRADFORD HOWLAND,
GEORGE F. ROBINSON.